June 28, 1966     H. J. McDERMOTT     3,257,939
HEATING ROLLER ASSEMBLY
Filed Nov. 20, 1963
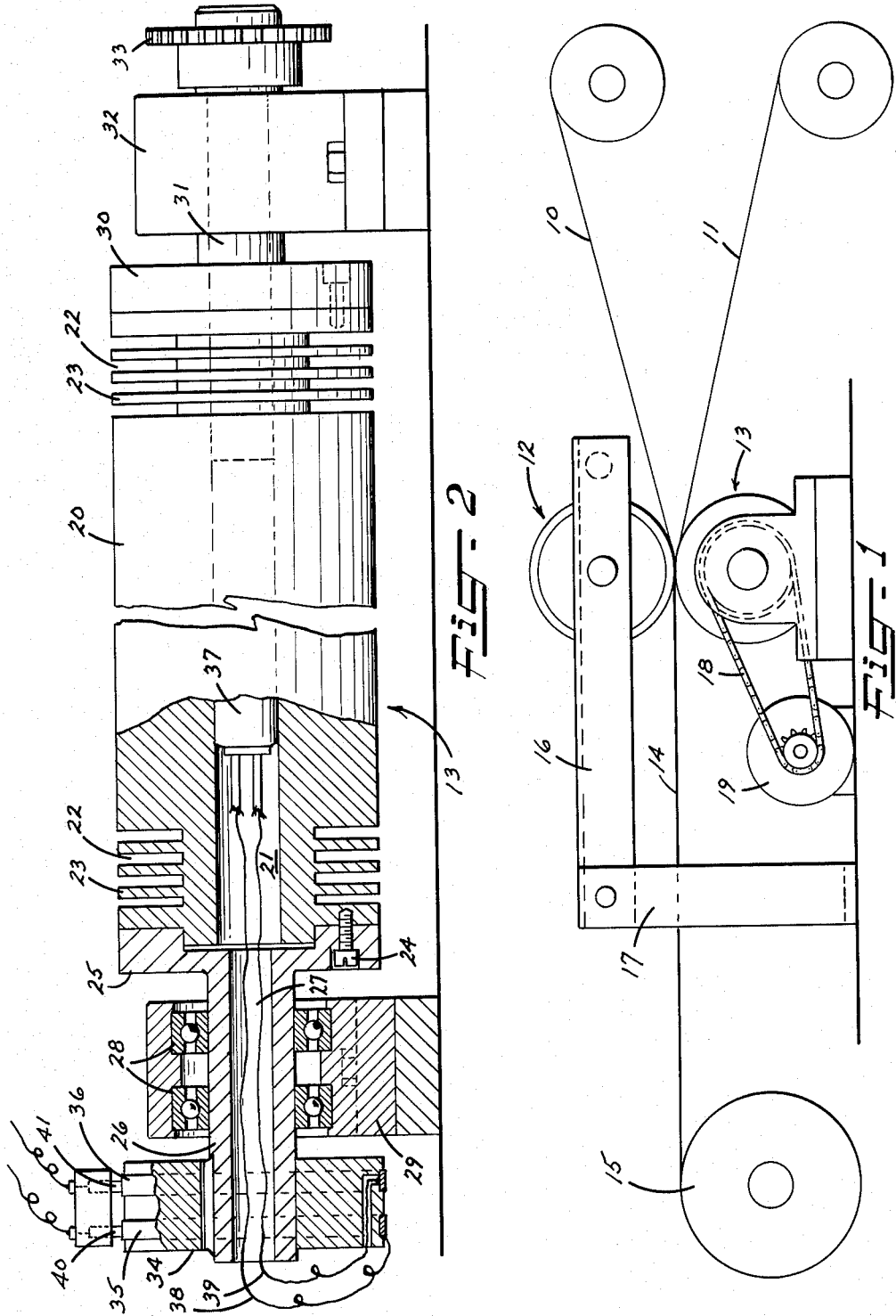

3,257,939
HEATING ROLLER ASSEMBLY
Henry J. McDermott, Collingdale, Pa., assignor to FMC Corporation, Philadelphia, Pa., a corporation of Delaware
Filed Nov. 20, 1963, Ser. No. 325,073
1 Claim. (Cl. 100—93)

This invention relates to a roller assembly adapted to apply heat to a continuous sheet or the like passing thereover and especially to a heated roller assembly used in a film laminating operation.

In laminating a pair of films together, particularly by means of a heat seal, it is a normal practice to run the films in face to face relationship through the nip between a pair of pressed together rollers, one or both of which is heated. It is economically advantageous to run the films at high speed and in order to provide sufficient heat to effect a seal in the short time that the film is in contact with the rollers it is necessary to maintain at least one of the rollers of the pair at a fairly high temperature. As with processing rollers generally, laminating rollers are mounted for rotation in bearings located close to the ends of the roller and heat from the roller tends to migrate to the bearings with consequent deleterious effect. In the past various schemes have been employed to prevent overheating of the bearings, one common arrangement being the circulation of water through and around the bearings.

It is the primary object of the present invention to provide a heating roller assembly wherein means is provided for preventing the heat of the roller from migrating to the bearings, thereby eliminating the necessity for special bearing cooling apparatus.

Other objects, features and advantages of the invention will become apparent as the description of a preferred embodiment thereof proceeds.

Referring now to the accompanying drawing:
FIG. 1 is a side elevational view of a laminating apparatus in connection with which the roller assembly of the present invention is useful; and
FIG. 2 is an elevational view partly in section of the new roller assembly.

In the apparatus of FIG. 1 a pair of films 10 and 11 are pulled from supply rolls and fed in face to face relationship through the nip between a pair of rollers indicated generally at 12 and 13. One or both of the films is either formed of a heat sealable material or has on one face a heat sealable coating and roller 13 is maintained at an elevated temperature so that as the films pass between the laminating rollers they become adhered together to form a single film or sheet 14 which is wound up on a roll 15. Roller 12 has a rubber covering and is mounted for rotation between a pair of arms 16, only one of which is shown, which are pivotally supported on upright standards 17, only one of which is shown. In the example shown the force of gravity is employed for maintaining roller 12 in contact with roller 13, or more properly in contact with the uppermost film 10. Roller 12 may either be positively driven or mounted for free rotation. Roller 13 is driven through a sprocket chain 18 from a suitable motor 19.

As shown in FIG. 2, roller 13 is part of an assembly which includes a cylindrical roll member 20 provided with an axial bore 21 extending therethrough. Bore 21 is of such diameter with respect to the outer diameter of roll 20 as to provide the roll with a thick wall as shown in the drawing. Preferably roll 20 is formed of aluminum but other metals may be employed if desired. A plurality of deep circumferential slots 22 are cut into the roll near the two ends thereof. Slots 22 are spaced from one another to provide heat radiating fins 23 therebetween. Roll 20 is of such length as to accommodate the full width of the films 10 and 11 on the smooth cylindrical face thereof between the slotted end portions.

Suitably secured to the left hand end of roll member 20 as by means of screws 24 is a roll supporting element 25 having a cylindrical portion 26 extending outwardly axially of the roll member. An axial bore 27 through the cylindrical portion 26 of the roll supporting member communicates at one end with the axial bore 21 of the roll member. Supporting element 25 is mounted for rotation in a suitable bearing means, said bearing means in the illustrated embodiment comprising a pair of ball bearings 28 mounted in a support 29.

To the right hand end of roll member 20 is secured a roll supporting element 30 having an outwardly directed cylindrical portion 31 mounted for rotation in a bearing 32. The bearing support for the right hand end of the roll is the same as that for left hand end. Secured to the cylindrical portion 31 outboard of bearing 32 is a sprocket 33 over which the chain 18 shown in FIG. 1 is trained to impart rotation to roll 20.

Secured to the outer end of the cylindrical portion 26 of supporting element 25 for rotation therewith is a slip ring assembly 34 comprising a pair of conductive rings 35 and 36 secured to the surface of a non-conductive cylindrical member. Heating means in the form of a cartridge-type resistance heating element 37 fits snugly within the bore 21 of roll 20 and said heating element is connected by wires 38 and 39 to slip rings 35 and 36 respectively. Brushes 40 and 41 supply an electric current to the slip rings and to heating element 37. Heat supplied by element 37 passes by conduction through the thick wall of roll member 20 to the surface thereof and as previously mentioned it is desirable to maintain the roll at a substantially elevated temperature. Fins 23 radiate the heat at the ends of the roll radially away from the roll and thereby prevent the heat from migrating by conduction to the bearing supports.

It will be seen that the above described arrangement eliminates the need for special cooling means for the bearings and thereby eliminates the possibility of contamination of the films from this source, thus providing for an unusually clean operation.

Having thus described a preferred form of the invention, what is claimed is:

A heating roller assembly comprising a cylindrical roll member, an axial bore through said roll member, said bore being of such diameter with respect to the outer diameter of said member as to provide the member with a thick wall through which heat may pass by conduction from the axial bore to the outer surface thereof, heating means in said axial bore for heating said roll member, supporting elements for said roll member, said supporting elements having cylindrical portions extending outwardly axially of said roll member, bearing means mounting the cylindrical portions of said supporting elements for rotation, and a plurality of relatively deep circumferential slots in the end portions of said roll member, said slots being spaced to provide heat radiating fins therebetween for dissipating heat whereby the heat of said roll member is prevented from migrating to said bearing means.

References Cited by the Examiner

UNITED STATES PATENTS

| | | | |
|---|---|---|---|
| 2,041,018 | 5/1936 | Persons | 219—230 |
| 2,047,372 | 7/1936 | Jalens | 219—469 |
| 3,027,285 | 3/1962 | Eisner et al. | 219—244 |
| 3,105,133 | 9/1963 | Norton | 219—469 |

FOREIGN PATENTS 631,618  8/1933  Germany.

RICHARD M. WOOD, *Primary Examiner.*

L. H. BENDER, *Assistant Examiner.*